July 19, 1932.  F. H. MUELLER  1,868,217
GAS METER HANGER
Filed June 14, 1930
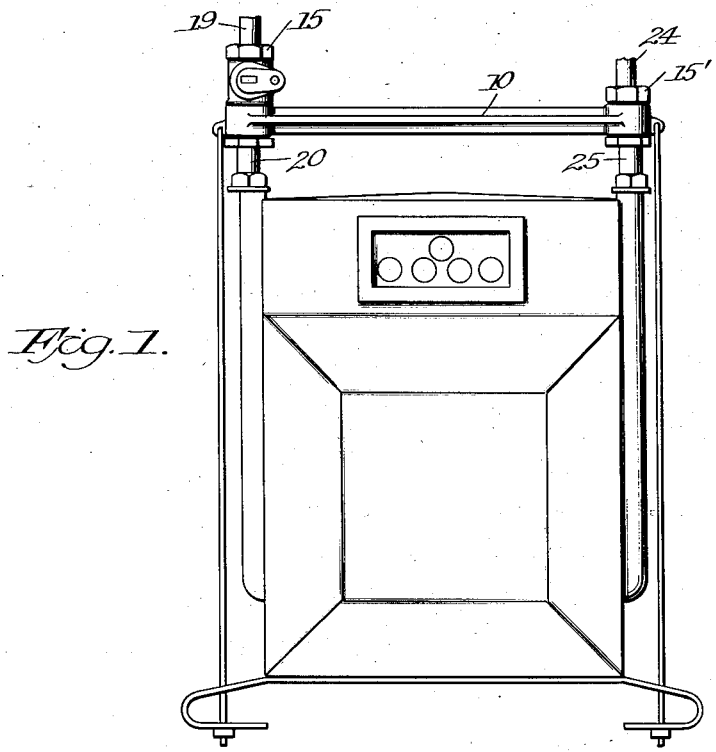
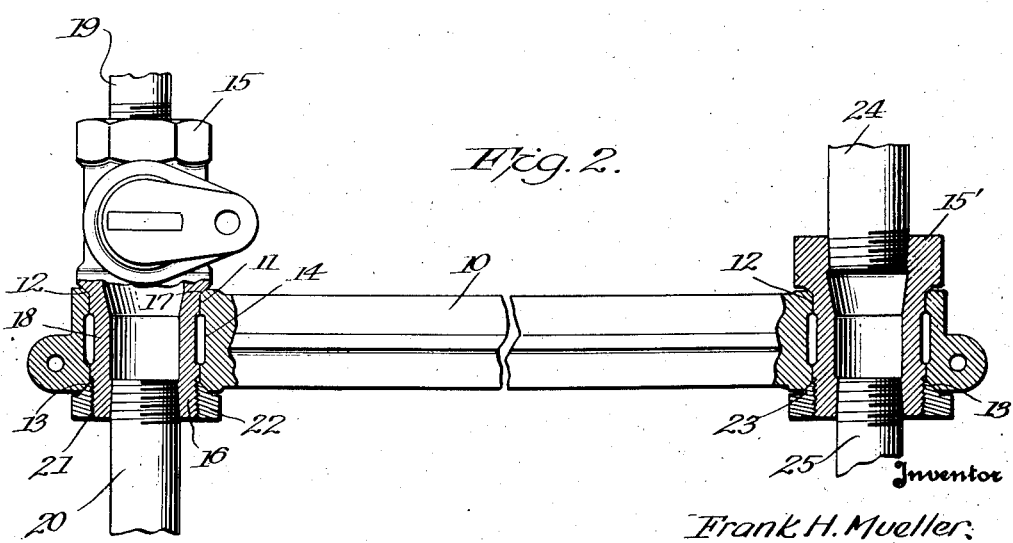
Inventor
Frank H. Mueller Patented July 19, 1932

1,868,217

UNITED STATES PATENT OFFICE

FRANK H. MUELLER, OF DECATUR, ILLINOIS, ASSIGNOR TO MUELLER CO., OF DECATUR, ILLINOIS, A CORPORATION OF ILLINOIS

GAS METER HANGER

Application filed June 14, 1930. Serial No. 461,294.

My invention relates to meter hangers and is primarily designed for use with hangers having two off-set connections from a meter, such as a gas meter.

The object of the invention is to produce a self-centering hanger avoiding all of the obstacles heretofore encountered in the use of the so-called "union" coupling requiring various types of objectionable swivel connections.

With the present construction, a swivel connection is afforded, but at the same time the connection with the offset pipes of the meter may be quickly made and with certainty that the fittings at each end of the arm will be in exact alignment with each other.

Referring to the drawing, Figure 1 is a plan view in the side elevation; and

Figure 2 is a sectional view.

In carrying out the invention, the hanger is indicated at 10 and comprises a single bar or casting having circular openings 11 and 12 at its ends. It will be observed that the wall of each opening at opposite ends is beveled as shown at 12 and 13 for a purpose which will presently be described. Intermediate its length, the wall of the opening 11 is peripherally cut away as shown at 14 to provide a reduced bearing surface.

The numeral 15 indicates the usual gas stop or valve and is provided with an extension or bushing 16 fitting in the opening 11. The stop is provided with a beveled portion 17 corresponding to the beveled portion 12, and intermediate its length is peripherally cut away as shown at 18 to an extent corresponding to the peripherally cut away portion 14 of the hanger so as to thereby reduce the bearing surface.

The stop 15 is connected with the gas supply pipe 19 and its extension at the opposite end is threaded interiorly for connection with a gas supply pipe 20. The extension at its lower end is externally threaded as shown at 21 to receive a nut 22. The nut 22 has a beveled portion 23 corresponding to the beveled portion 13.

By this construction, the stop 15 with its extension or bushing 16, and the bushing 15' can be disposed in the openings 11 and 12 and thereafter connected to the pipes 19 and 25 respectively. The nuts 22 are then loosely threaded to the externally threaded portions of the extension and bushing, and the pipe 20 and the pipe 25 respectively are connected to the inner end of the bushing. Thereupon the nuts 22 will be tightened up upon the bushing or extension to the desired amount and there is no opportunity for the bushings to move out of alignment with the respective pipes 19, 20, 24 and 25, at either end of the hanger.

It will be understood that with previous constructions where the bushing was held in place by a laterally disposed screw extending through the wall of the opening, that on account of irregularities in the machining of the opening or in the extension of the stop or the bushing, the said screw would force the stop or fitting out of parallel alignment with the fitting at the opposite end so that there was always the possibility of a bad connection between one or both of the outlet pipes.

The present invention overcomes this difficulty in that it is at all times self-centering and, moreover, a swivel connection is provided without recourse to a union coupling where a set screw or tapered extension was necessary to allow swiveling.

In other words, with the present invention, the extension or bushing at each end of the hanger is substantially independent so that should there be any irregularities in machining, this difficulty will be absorbed without producing a bad connection, primarily because the bushing at the respective ends of the hanger and the nuts 22 afford a self-centering independent construction.

It will be understood that the invention is subject to various modifications and changes all of which, however, are contemplated as being within the scope of the present invention and set forth in the appended claims.

I claim:

1. A meter hanger comprising a bar member having at one end means for engaging a conduit element and provided at the other end with an opening, a bushing in said opening, said bushing provided at its ends with screw threads for direct connection to a service pipe and to a coupling nipple, a nut member adapted to be threaded on said bushing, one of said members having a bevelled portion and the other member formed to engage said bevelled portion to center the bushing in said opening.

2. A meter hanger comprising a bar member provided at each end with an opening, a bushing in each opening, each bushing provided at its ends with screw threads for direct connection to a service pipe and to a coupling nipple, and a nut member adapted to be threaded on said bushing, one of said members having a bevelled portion and the other member formed to engage said bevelled portion to center the bushing in said opening.

3. A meter hanger comprising a bar member having at one end means for engaging a conduit element and provided at the other end with an opening, a bushing member in said opening, said bushing member provided at its ends with screw threads for direct connection to a service pipe and to a coupling nipple, one of said members having a bevelled portion and the other member formed to engage said bevelled portion to center the bushing member in said opening, and means for preventing axial movement of the bushing member.

4. A meter hanger comprising a bar member provided at each end with an opening, a bushing member in each opening, each bushing member provided at its ends with screw threads for direct connection to a service pipe and to a coupling nipple, one of said members having a bevelled portion and the other member formed to engage said bevelled portion to center the bushing member in said opening, and means for preventing axial movement of the bushing member.

5. A meter hanger comprising a bar member having at one end means for engaging a conduit element and provided at the other end with an opening, a bushing member mounted in said opening and provided with a substantially bevelled seat portion at one end, said bushing member provided at its ends with screw threads for direct connection to a service pipe and to a coupling nipple, a nut member threaded on the bushing at the opposite end from said seat, and formed with a substantially bevelled portion, the wall of said opening being formed to engage the substantially bevelled portions of said bushing member and said nut member respectively to center the bushing in said opening, said nut member cooperating with the sleeve to prevent axial movement of the sleeve in the opening.

6. A meter hanger comprising a bar member provided at each end with an opening, a bushing member mounted in each opening and provided with a substantially bevelled seat portion at one end, said bushing member provided at its ends with screw threads for direct connection to a service pipe and to a coupling nipple, a nut member threaded on the bushing at the opposite end from said seat, and formed with a substantially bevelled portion, the wall of said opening being formed to engage the substantially bevelled portions of said bushing member and said nut member respectively to center the bushing in said opening, said nut member cooperating with the bushing to prevent axial movement of the bushing in the opening.

7. A meter hanger comprising a bar member having at one end means for engaging a conduit element and provided at the other end with an opening, a coupling member associated with the bar and provided at its ends with screw threads for direct connection to a service pipe and to a coupling nipple, said coupling member engaging the bar at the opening and the opposed engaging surfaces of the coupling member and bar being substantially bevelled to permit centering of the coupling member with respect to the bar, and means for preventing axial movement of the coupling member.

8. A meter hanger comprising a bar member provided at each end with an opening, a coupling member associated with each end of the bar and provided at its ends with screw threads for direct connection to a service pipe and to a coupling nipple, each coupling member engaging the bar at the adjacent opening and the opposed engaging surfaces of the coupling member and bar being substantially bevelled to permit centering of the coupling member with respect to the bar, and means for preventing axial movement of the coupling member.

In testimony whereof I have hereunto set my hand.

FRANK H. MUELLER.